United States Patent
Booth et al.

(10) Patent No.: US 9,213,396 B1
(45) Date of Patent: Dec. 15, 2015

(54) METHODS AND APPARATUS FOR SETTING THE ADDRESS OF A MODULE USING A CLOCK

(71) Applicant: Lexmark International, Inc., Lexington, KY (US)

(72) Inventors: James Ronald Booth, Nicholasville, KY (US); Adam J. Ahne, Lexington, KY (US)

(73) Assignee: Lexmark International, Inc. KY (US)

( * ) Notice: Subject to any disclaimer, the term of this patent is extended or adjusted under 35 U.S.C. 154(b) by 0 days.

(21) Appl. No.: 14/703,376

(22) Filed: May 4, 2015

Related U.S. Application Data (63) Continuation-in-part of application No. 14/517,394, filed on Oct. 17, 2014.

(51) Int. Cl.
*G06F 13/42* (2006.01)
*G06F 1/32* (2006.01)

(52) U.S. Cl.
CPC .......... *G06F 1/324* (2013.01); *G06F 13/4282* (2013.01); *G06F 2213/0016* (2013.01); *G06F 2213/0052* (2013.01)

(58) Field of Classification Search
CPC .............. G06F 13/4291; G06F 2213/0052; G06F 2213/0016
See application file for complete search history.

(56) References Cited

U.S. PATENT DOCUMENTS

| | | | |
|---|---|---|---|
| 5,210,846 A | 5/1993 | Lee | |
| 5,226,123 A | 7/1993 | Vockenhuber | |
| 5,270,972 A | 12/1993 | Craig | |
| 5,831,546 A | 11/1998 | Costa | |
| 6,255,973 B1 | 7/2001 | Smith | |
| 7,249,209 B2 * | 7/2007 | Yang | 710/110 |
| 7,827,330 B2 * | 11/2010 | Richards et al. | 710/69 |
| 7,863,938 B2 * | 1/2011 | Ito | 326/105 |
| 8,040,215 B2 | 10/2011 | Zakriti | |
| 8,250,269 B2 * | 8/2012 | Hsieh | 710/104 |
| 8,330,875 B2 * | 12/2012 | Fukui | 348/733 |
| 8,667,204 B2 * | 3/2014 | Fischer et al. | 710/305 |
| 8,793,418 B2 | 7/2014 | Evans | |
| 8,966,193 B2 * | 2/2015 | Booth et al. | 711/156 |
| 2006/0123168 A1 * | 6/2006 | Lang | 710/110 |
| 2006/0291406 A1 * | 12/2006 | Booth et al. | 370/289 |
| 2007/0079125 A1 * | 4/2007 | Adkins et al. | 713/176 |
| 2011/0264850 A1 * | 10/2011 | Booth et al. | 711/103 |
| 2013/0268231 A1 * | 10/2013 | Sato | 702/141 |

* cited by examiner

*Primary Examiner* — Brian Misiura (57) ABSTRACT

A method of operating a module is disclosed. The method includes determining a voltage between an I2C clock connection and a ground connection, setting a module communication address based on the determined voltage, receiving via the I2C clock connection and the I2C data connection a first command addressed to the module communication address, and responding to the first command. Other methods and devices are disclosed.

16 Claims, 10 Drawing Sheets

METHODS AND APPARATUS FOR SETTING THE ADDRESS OF A MODULE USING A CLOCK

CROSS REFERENCES TO RELATED APPLICATIONS

This application is a continuation-in-part application of U.S. patent application Ser. No. 14/517,394, filed Oct. 17, 2014, entitled "SYSTEMS FOR SETTING THE ADDRESS OF A MODULE." This patent application is related to U.S. patent application Ser. No. 14/703,442 entitled "METHODS AND APPARATUS FOR SETTING THE ADDRESS OF A MODULE USING A VOLTAGE" and assigned to the assignee of the present application.

BACKGROUND

1. Field of the Disclosure

The present disclosure relates generally to slave devices on a communication bus and more particularly to slave modules on an I2C bus.

2. Description of the Related Art

I2C (also known as I²C) is an inter-device communication standard. An I2C bus has one master device and one or more slave devices. Each slave device has a unique communication address so that the master device can direct communication to a particular slave device.

Printers have user-replaceable supply items such as toner bottles. These supply items may have authentication circuits to distinguish original equipment manufactured toner bottles from third-party toner bottles, since different operating procedures may apply. Authentication circuits may implement cryptography algorithms to increase confidence in the authentication. A single color printer, such as a mono printer, may have an authentication circuit on a toner bottle and another authentication circuit on an imaging unit. These modules that contain the authentication circuits may be nearly identical, the only difference being a non-volatile memory variable that contains the module address. During manufacturing, extra expense must be expended to keep track of these two similar, but non-identical, modules, and the system will not operate correctly if the modules are mixed up. What is needed is a way to use identical modules on multiple supply items.

SUMMARY

The invention, in one form thereof, is directed to a method of operating a module having a power connection, a ground connection, an I2C clock connection, and an I2C data connection. The method includes determining a voltage between the I2C clock connection and the ground connection, setting a module communication address based on the determined voltage, receiving via the I2C clock connection and the I2C data connection a first command addressed to the module communication address, and responding to the first command.

The invention, in another form thereof, is directed to an authentication circuit having a power input pin, an I2C clock pin, and an I2C data pin. The authentication circuit has a slave I2C address and is configured to set the slave I2C address to one of a first address and a second address based on a voltage on the I2C clock pin when the I2C clock pin is greater than 1V while the I2C data pin transitions from greater than 1V to less than 1V.

The invention, in yet another form thereof, is directed to an application specific integrated circuit having a power pin, a ground pin, an I2C clock pin, an I2C data pin, a serial communication module having an address register having a plurality of bits including a least significant bit, the serial communication module is coupled to the power pin, the ground pin, the I2C clock pin, and the I2C data pin, and an analog-to-digital converter having an input coupled to the I2C clock pin and a first output coupled to the least significant bit of the address register.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
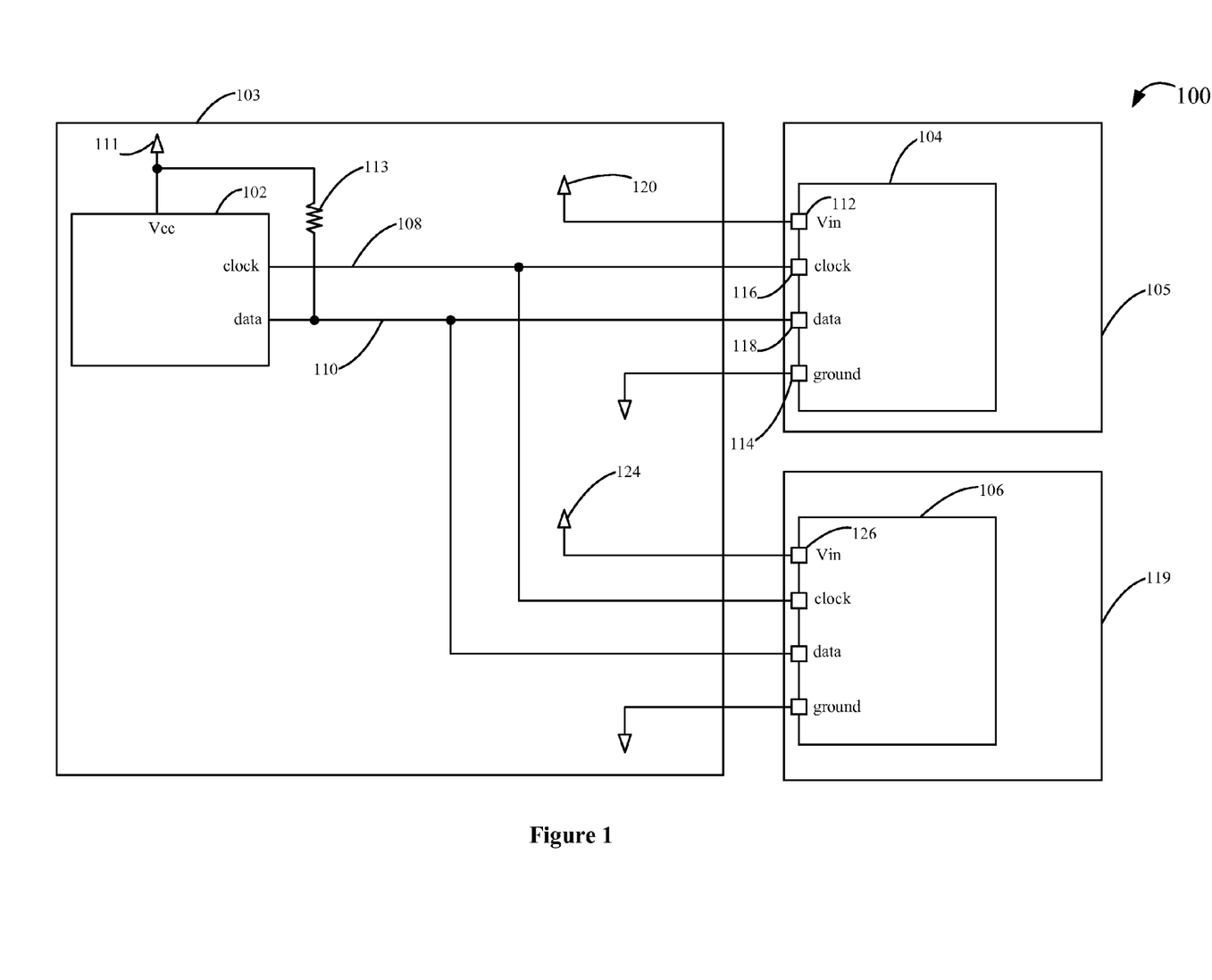
FIG. 1 is a schematic diagram depiction of a printer module network according to one embodiment of the present disclosure.

Referring now to the drawings and more particularly to FIG. 1, there is shown a schematic diagram depiction of a circuit according to one embodiment of the present disclosure. A printer module network 100) has a system application specific integrated circuit (ASIC) 102 coupled to a first module 104 and to a second module 106 via an I2C bus. The I2C bus has a clock line 108 driven by the system ASIC 102 and a data line 110 driven bi-directionally by the system ASIC 102, the first module 104, and the second module 106. The clock line and the data line are serial communication connections.

The system ASIC 102 is located on a system printed circuit board (PCB) 103. The first module 104 is located on a user-replaceable component, e.g., as shown a toner bottle 105. The first module 104 includes a PCB. A power connection 112, a ground connection 114, a clock connection 116, and a data connection 118 are, for example, conductive pads located on the first-module PCB. Compliant metal fingers touch the
}} conductive pads forming electrical connections between the system PCB and the first module 104. Alternatively, power connection 112, ground connection 114, clock connection 116, and data connection 118 may be made with other reusable connections such as pin-in-socket connectors. The second module 106 has similar connections and is located on, for example, as shown an imaging unit 119.

The system ASIC 102 is an I2C master, the first module 104 and the second module 106 are I2C slaves. As is known in the art, a serial communication in the I2C data format contains a header that has a slave I2C address. Each slave will only respond to communications that are addressed to its communication address e.g. I2C address. Thus, to prevent conflicts, each slave on the I2C bus has a unique communication address. In the I2C data format, a data packet follows the header. The data packet may be one or more bytes in length. The data packet may contain a first byte that is a command and zero or more following bytes which are data related to the command such as, for example, a memory address and a value to write to that memory address. Some commands may have zero following bytes such as, for example, a reset command. A slave may respond to a command by serially writing one or more bytes onto the I2C data line. The I2C data line is an open-drain line i.e. the master may pull it down to a logic low level and a slave may pull it down to a logic low level otherwise a pull-up resistor 113 will pull it up to a logic high level. Pull-up resistor 113 is connected to the system ASIC power voltage 111, which in this example embodiment is 3.0V. The system ASIC 102 drives the clock line 108 through a push-pull output drive circuit powered by the system ASIC power voltage 111. Preferably, the first module 104 and the second module 106 power their I2C input buffers from a voltage that is greater than the system ASIC power voltage 111 to avoid turning on ESD protection diodes located in the I2C input buffers.

The first module 104 and the second module 106 are identical. The communication address of the first module 104 is not fixed. Instead, it is controlled by a first power voltage 120 coupled to power connection 112. The first power voltage 120 is, for example, 4V, and the communication address of the first module 104 is, for example, binary 0000010. The communication address of the first module 104 is set by circuitry located within the first module 104, as will be described later. Similarly, a second power voltage 124 is coupled to the power connection 126 of the second module 106. The second power voltage 124 is, for example, 5V, and the communication address of the second module 106 is, for example, binary 0000011. Note that if, for example, the second module 106 was powered by the first power voltage 120 instead of by the second power voltage 124 then the second module 106 would have the same communication address as the first module 104 since both modules would be powered from the same voltage.

Note that the disclosed system has two identical modules on the same I2C bus but at different addresses, and this function is provided without adding additional connections. This allows identical modules to be populated into multiple system components, which simplifies manufacturing and lowers cost.

Note that other communication systems may be used instead of I2C. For example, a universal serial bus (USB) system also has slave devices with unique communication addresses. The module communication addresses are not limited to one of two possible addresses. For example, four possible addresses would be advantageous for toner bottles of a four-color printer.

Figure 2:
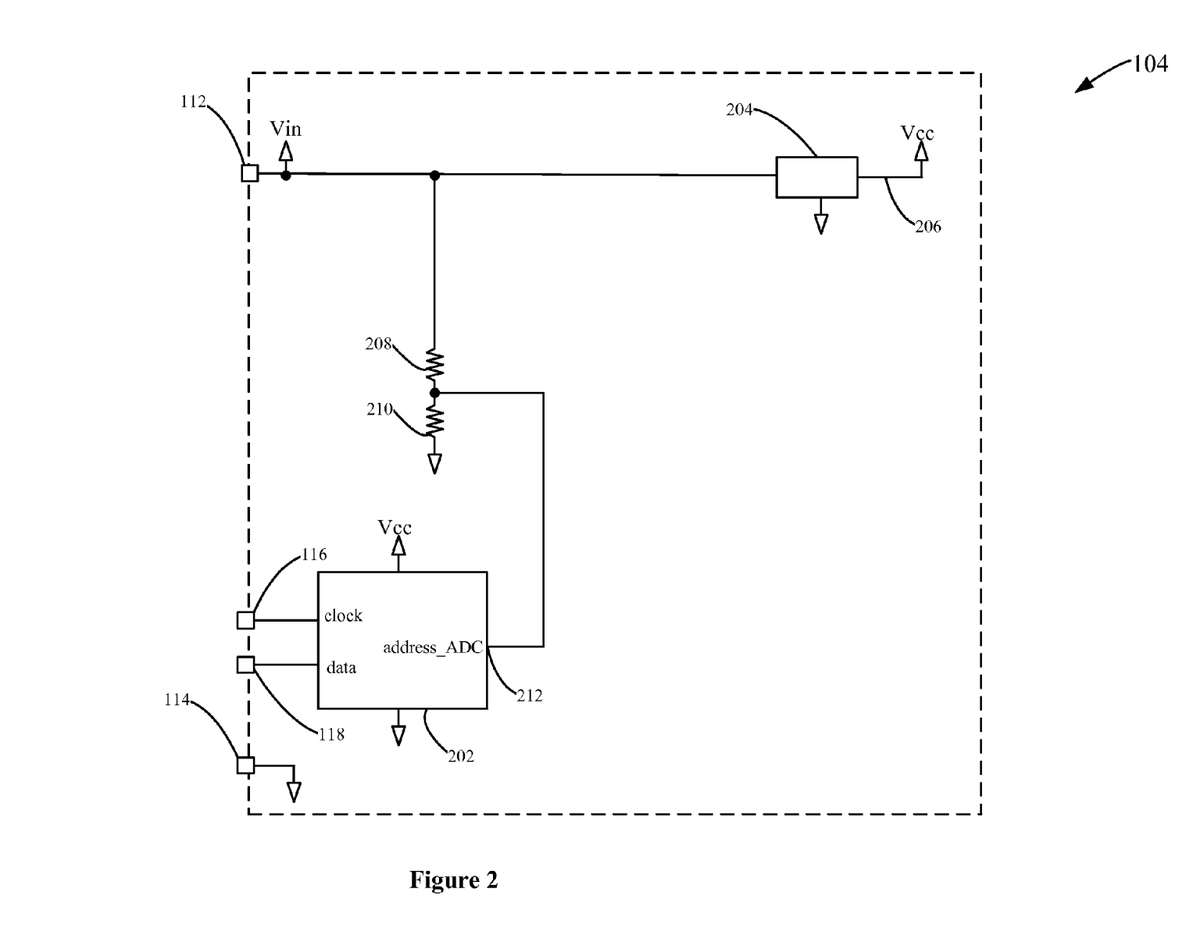
FIG. 2 is a schematic diagram of an authentication module according to one embodiment of the present disclosure.

FIG. 2 shows details of the first module 104. The first module 104 is an authentication module that contains an authentication circuit 202 which implements an authentication procedure. An example authentication procedure involves a "challenge" protocol in which a data set is provided to two "authentication engines", the first being in the authentication circuit 202 and the second being in the system ASIC 102. During authentication, both the authentication circuit 202 and the system ASIC 102 "seed" the data set with a "secret value" that is not revealed by the authentication circuit 202 or the system ASIC 102. Typically, a one-way hash value of the "seeded data" is computed by the authentication circuit 202 and the system ASIC 102. The authentication circuit 202 then makes the one-way hash value available to the system ASIC 102, which compares the hash value (computed by the authentication circuit 202) to a hash value computed by the system ASIC 102. If the hash values match, the toner bottle 105 is authorized for use. Other authentication procedures may be implemented by the authentication circuit 202. The authentication circuit 202 and the first module 104 may be configured to perform one or more of the methods detailed below. Such configuration may be firmware embedded in the authentication circuit 202 to be executed by a microcontroller embedded in the authentication circuit 202, a hardware state machine embedded in the authentication circuit 202, etc.

The power connection 112 is coupled to a voltage regulator 204 that generates an operating voltage 206 to power the authentication circuit 202. The voltage regulator 204 regulates the operating voltage 206 to a predetermined value e.g. 3.3V. Of course, if the authentication circuit 202 is designed to operate over a wide range of operating voltages the voltage regulator 204 may be omitted if, for example, the authentication circuit 202 contains an integrated voltage regulator. In this example, the voltage regulator is a linear regulator and thus the operating voltage 206 is at least two hundred millivolts lower than the DC voltage on the power connection 112. Alternatively, the voltage regulator 204 may be a series resistor and a zener diode connected to ground.

The power connection 112 is coupled to a resistor divider made of resistor 208 and resistor 210. Resistor 208 and resistor 210 may be, for example, 1 k ohm each providing a voltage attenuation of ½. The output of the voltage divider is coupled to an address_ADC input 212 of the authentication circuit 202. Within the authentication circuit 202, this input is connected to an analog-to-digital converter (ADC) such as, for example, a comparator, a successive approximation ADC, etc. The output of the ADC is one or more binary bits that are used to set the serial communication address of the authentication circuit 202. For example, if Vin is less than 4.5V the communication address may be set to binary 0000010, otherwise the communication address may be set to binary 0000011. Of course, other predetermined voltages may be used. For example, the authentication circuit may be configured to set its I2C address to 0000010 if Vin is 3.3V and to 0000011 if Vin is 5V.

The ADC may use the operating voltage source 206 as a voltage reference. Alternatively, the authentication circuit 202 may generate a dedicated voltage reference for the ADC. The address_ADC input 212 is an external pin of the IC package that houses the authentication circuit i.e. the address input node is an external pin of the authentication circuit. Alternatively, the resistor divider may be integrated into the IC package and the address_ADC input may be an internal node. In this example, the least significant bit (LSB) is dependent on the voltage coupled to the module power connection. The other bits are independent of the voltage coupled to the module power connection. One or more of these independent bits may be stored in a non-volatile memory located within a module. In this way, the base address of a module may be changed to avoid conflicts with other devices on the same I2C bus such as, for example, non-authentication modules. In this example, the address input node is coupled to the power connection through a resistor divider. Alternatively, a different voltage attenuator may be used such as, for example, an op-amp amplifier configured to attenuate.

The voltage on the power connection 112 may also control the set of commands recognized by the first module 104. For example, the authentication circuit 202 may be configured to reply to a first command addressed to its I2C address when the voltage on the address_ADC input 212 (Vain) is 2V and to not reply to the first command when Vain is 3V. Similarly, the authentication circuit may be configured to reply to a second command when Vain is 3V and not reply to the second command when Vain is 2V. This behavior may be continued for multiple Vain, for example the authentication circuit may be configured to reply to a third command addressed to its I2C address when Vain is 2.5V and not reply to the third command when Vain is 2V or 3V. This may be implemented by comparing Vain to predetermined thresholds to segment the voltage range of Vain. For example, the authentication circuit 202 may be configured to respond to the second command only if Vain is greater than 2.75V. The first command, second command, and third command are different from each other. In this way, the operating behavior of, for example, an authentication module attached to a toner bottle may be different than the operating behavior of an authentication module attached to a fuser even though the authentication modules are identical. This further improves manufacturing efficiency as discussed previously. Also, in this example, the address_ADC input 212 performs two functions: setting the I2C address and controlling the set of commands recognized by the authentication circuit 202. This is beneficial because it reduces the pin count of the authentication circuit 202 and thus may reduce its cost.

Figure 3:
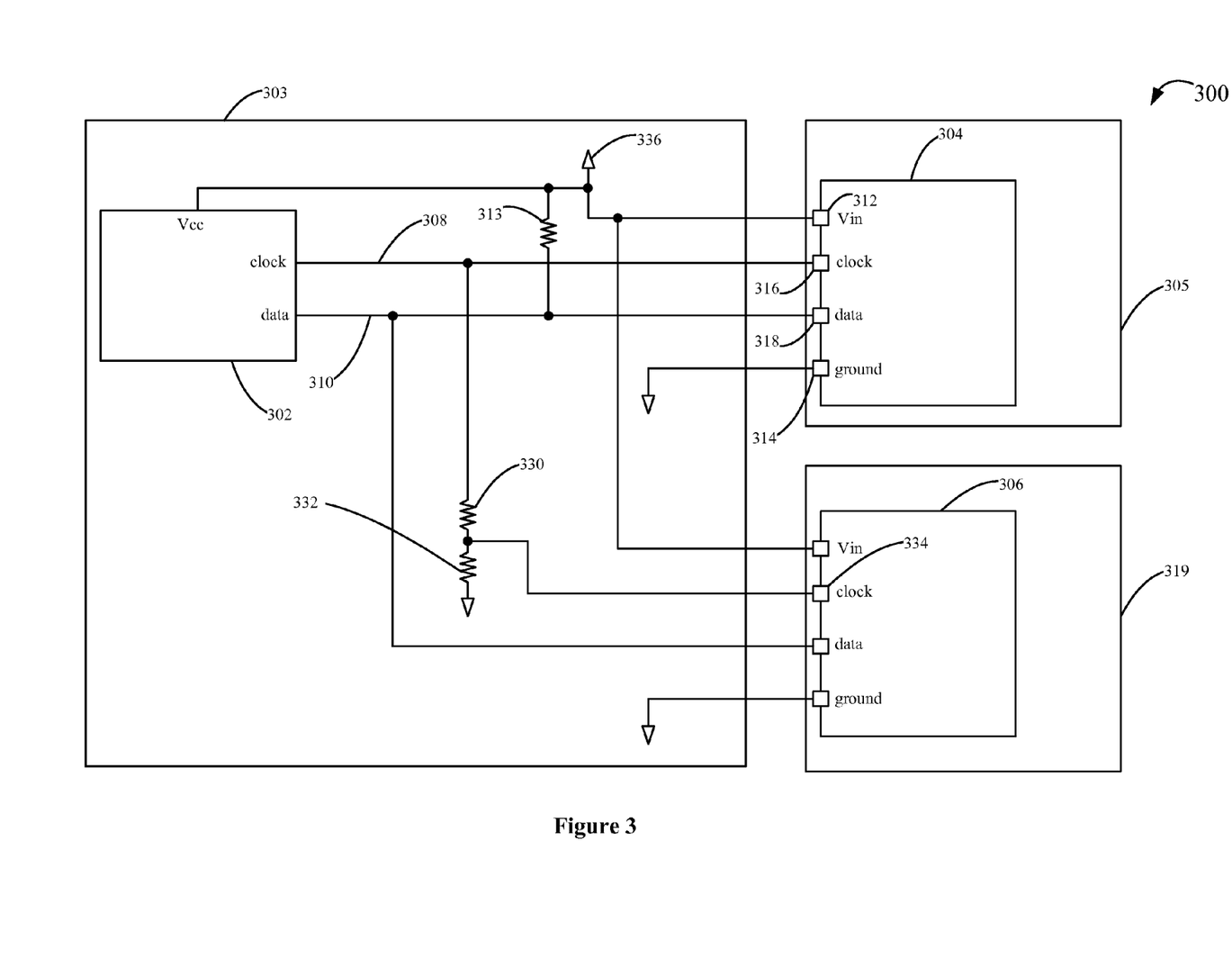
FIG. 3 is a schematic diagram depiction of a printer module network according to one embodiment of the present disclosure.

FIG. 3 shows a schematic diagram depiction of a circuit according to another embodiment of the present disclosure. A printer module network 300 has a system ASIC 302 coupled to a third module 304 and to a fourth module 306 via an I2C bus. The I2C bus has a clock line 308 driven by the system ASIC 302 and a data line 310 driven bi-directionally by the system ASIC 302, the third module 304, and the fourth module 306. The clock line and the data line are serial communication connections. The system ASIC 302 drives the clock line 308 with a push-pull output drive circuit powered from a system PCB 303 power supply 336. The data line has a pullup resistor 313 connected to power supply 336.

The system ASIC 302 is located on a system PCB 303. The third module 304 is located on a user-replaceable component, e.g., as shown a toner bottle 305. The third module 304 includes a PCB. A power connection 312, a ground connection 314, a clock connection 316, and a data connection 318 are, for example, conductive pads located on the first-module PCB. Compliant metal fingers touch the conductive pads forming electrical connections between the system PCB 303 and the first module 104. Alternatively, power connection 312, ground connection 314, clock connection 316, and data connection 318 may be made with other reusable connections such as pin-in-socket connectors. The fourth module 306 has similar connections and is located on, for example, as shown an imaging unit 319. The system ASIC 302 is identical to previously described system ASIC 102.

The third module 304 and the fourth module 306 are identical. The communication address of the third module 304 is not fixed. Instead, it is controlled by the logic-high voltage (LHV) of the clock line 308. The LHV of the clock line 308 is driven by the system ASIC 303 and is, for example, 3.3V. The clock line 308 is directly coupled to the clock connection 316 of the third module 304. Thus the LHV of the clock connection 316 is, in this example, 3.3V, and the communication address of the third module 304 is, for example, binary 00000101. The communication address of the third module 304 is set by circuitry located within the third module 304, as will be described later. For the fourth module 306, the clock line 308 passes through a resistor divider made of resistor 330 and resistor 332. The output of the resistor divider is coupled to the clock connection 334 of the fourth module 306. Thus, the LHV of clock connection 334 is less than the LHV of clock connection 316. In this example, resistor 330 is 1 k ohm, resistor 332 is 5 k ohm, and thus LHV of clock connection 334 is 2.75V. The communication address of the fourth module 306 is controlled by the LHV of clock connection 334 and is, for example, binary 0000100.

It is preferable to adjust the I2C clock logic high voltage instead of the logic low voltage since the logic high voltage of a module may be individualized by adding two inexpensive resistors, as shown in FIG. 3. Individualizing the logic low voltage of a module is more complicated and may be more expensive to implement.

Figure 4:
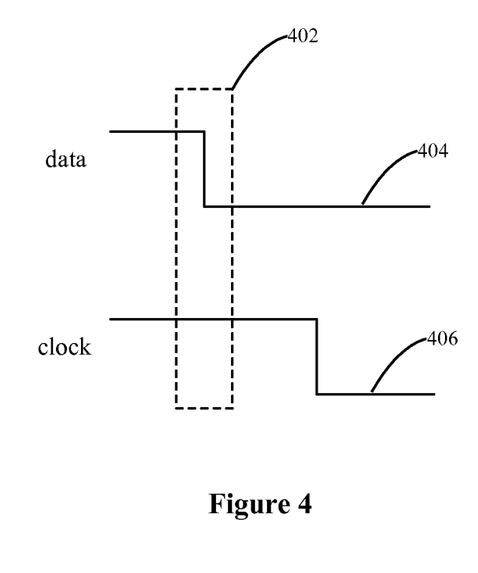
FIG. 4 is a diagram of an I2C start condition.

The third module 304 may set its communication address when the I2C bus is idle i.e. between transmissions. Alternatively, the third module 304 may sample the clock connection 116 at the I2C start condition, as shown in FIG. 4. As is known in the art, an I2C start condition 402 occurs when an I2C data line 404 transitions from a logic high voltage (e.g. 3.3V) to a logic low level (e.g. 0V) while an I2C clock line 406 is at a logic high voltage. Thus, the third module 304 may trigger setting its communication address when the I2C start condition is detected since, by definition of an I2C start condition, the clock connection 116 will be at LHV. Triggering at the start condition is preferable to trigging when the I2C bus is idle because the logic to determine when the I2C bus is idle may be complicated to implement.

Figure 5:
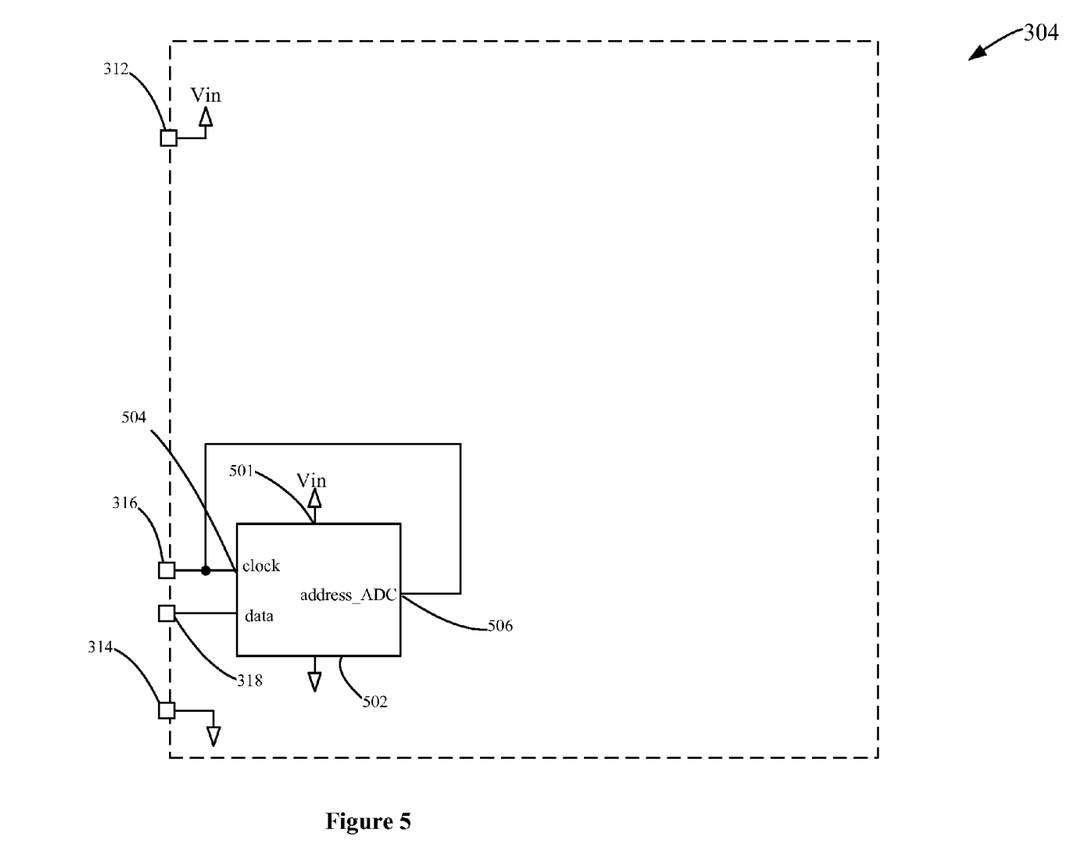
FIG. 5 is a schematic diagram depiction of an authentication module according to one embodiment of the present disclosure.

FIG. 5 shows details of the third module 304. The third module 304 is an authentication module that contains an authentication circuit 502 which implements an authentication procedure. The authentication circuit 502 and the third module 304 may be configured to perform one or more of the methods detailed below. The authentication circuit 502 has a Vcc pin 501 which is directly coupled to the power connection 312.

The clock connection 316 is directly coupled to a clock input 504 of the authentication circuit 502. The clock input 504 may be, for example, a digital input with a voltage-input-high (VIH) of 60% of the Vcc pin 501, and a voltage-input-low (VIL) of 40% of the Vcc pin 501. Thus, in this example, as long as LHV of the clock connection 316 is greater than 60% of the Vcc pin 501 the clock input 504 will be at a logic high state. Accordingly, the VIH of the clock input 504 sets the minimum LHV of the clock connection 316 that is available for communication-address individualization. Of course, other digital input configurations as are known in the art may be used. For example, the clock input 504 may have a VIH of 1.1V and a VIL of 0.9V. The data input may have the same VIH and VIL of the clock input.

The clock connection 316 is also directly coupled to an address_ADC input 506 of the authentication circuit 502. Within the authentication circuit 502, this input is connected to an analog-to-digital converter (ADC) such as, for example, a comparator, a successive approximation ADC, etc. The output of the ADC is one or more binary bits that are used to set the serial communication address of the authentication circuit 202. For example, if LHV of the clock connection 316 is less than 90% of the Vcc pin 501 the communication address may be set to binary 0000100, otherwise the communication address may be set to binary 0000101. In this example, ADC uses the Vcc pin 501 as a voltage reference and measurements of LHV of the clock input 316 will be relative to the power connection 312 i.e. the third module 304 makes "relative measurements". Alternatively, the third module 304 may generate a dedicated voltage reference for the ADC and measurements of LHV of the clock input 316 will not be relative to the power connection 312 i.e. the third module 304 makes "absolute measurements". Here, it is preferable to use relative measurements because it avoids errors due to differences between an third module 304 voltage reference and a system PCB 303 power supply 336 that powers the system ASIC 302 that drives the clock line 308 high and low. Alternatively, the address_ADC input may be internally connected to the clock input 504.

Figure 6:
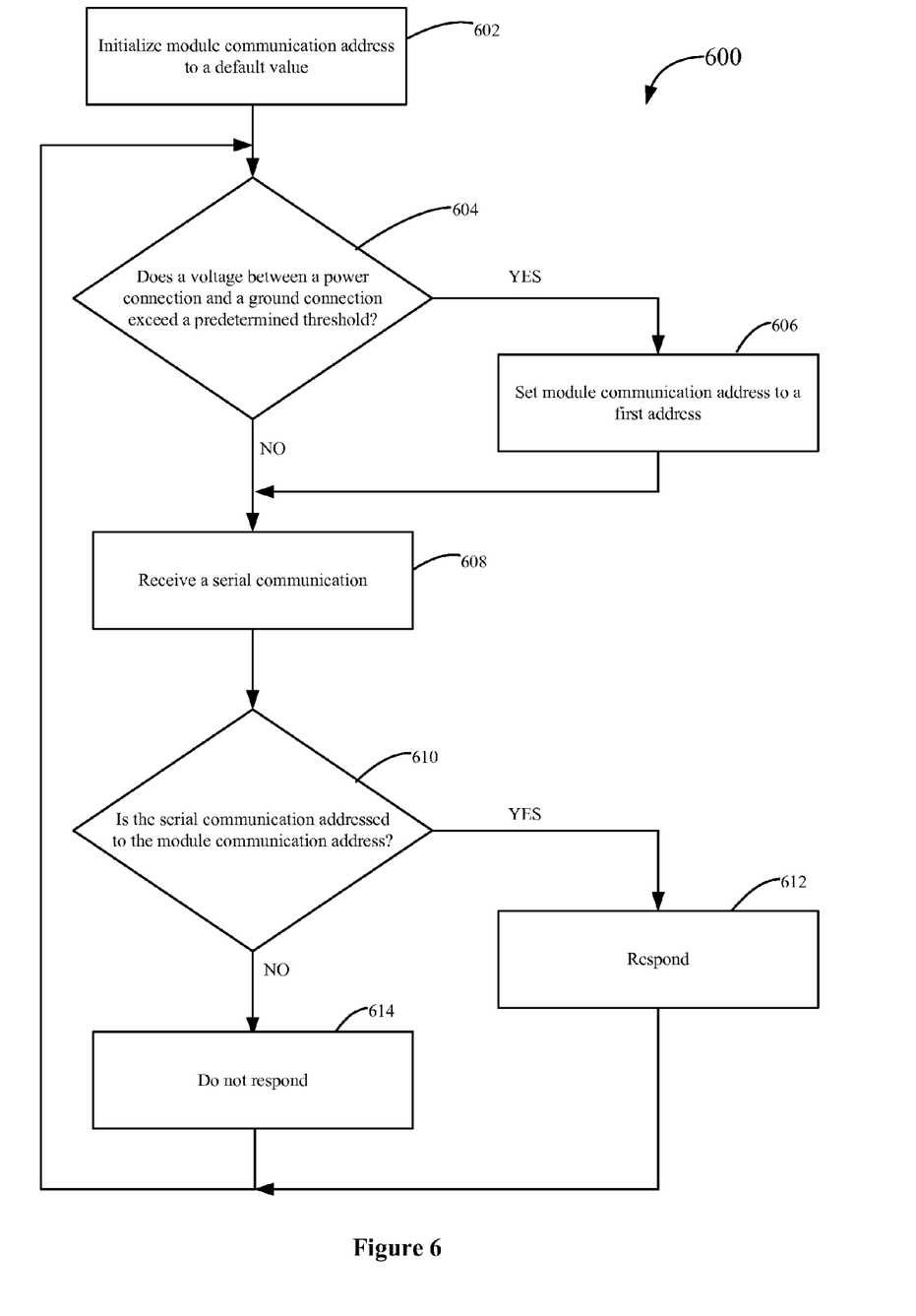
FIG. 6, FIG. 7, and FIG. 8 depict flowcharts of methods of embodiments of the present disclosure.

FIG. 6 shows an example embodiment of a method of operating an authentication module according to one embodiment. Method 600 sets a module communication address based on a voltage between the module power connection and ground connection. This enables identical modules to be coupled to the same communication bus at different addresses. The module has a power connection, a ground connection, and a serial communication connection e.g. I2C, USB, etc. If the serial communication connection is I2C then serial communications will be formatted in the I2C data format as is known in the art.

At block 602, a module communication address is initialized to a default value. This may be performed, for example, during a power-up sequence.

At block 604, the method determines if a voltage between the power connection and the ground connection exceeds a predetermined threshold. If so determined, at block 606 the module communication address is set to a first address. The predetermined threshold may be a voltage such as, for example, 4.5V.

At block 608, a serial communication is received via the serial communication connection. At block 610, the method determines if the serial communication is addressed to the module communication address. If so determined, at block 612 the serial communication is responded to via the serial communication connection, otherwise at block 614 the serial communication is not responded to. The method loops to block 604 and repeats.

Figure 7:
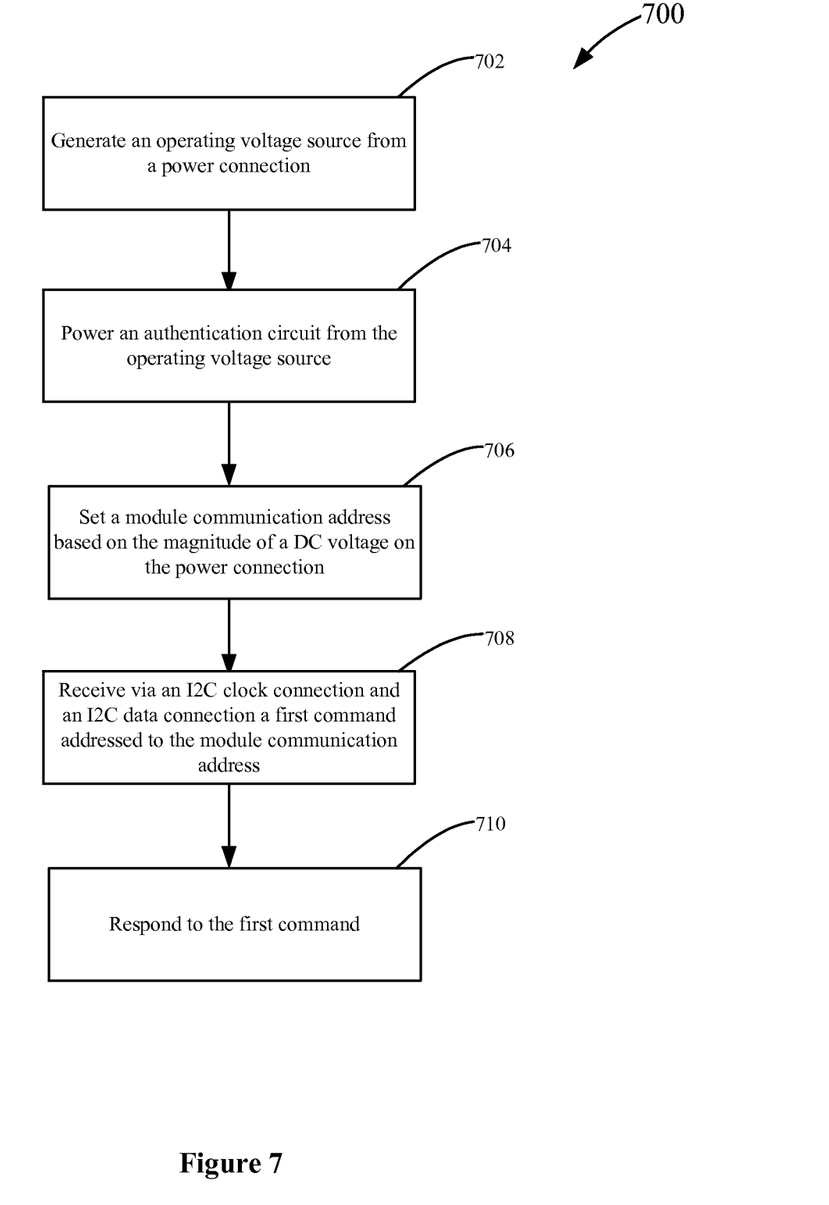

FIG. 7 shows an example embodiment of a method of operating an authentication module according to one embodiment. The module has a power connection, a ground connection, an I2C clock connection, and an I2C data connection.

At block 702, an operating voltage source is generated from the power connection. The operating voltage may be generated, for example, by a linear regulator and thus the operating voltage may be at least two hundred millivolts lower than the DC voltage on the power connection. The operating voltage may be regulated to a predetermined value, for example 3.3V, to a predetermined tolerance, say 5%, over a range of operating currents, say 0 mA to 10 mA. At block 704, an authentication circuit is powered from the operating voltage source.

At block 706, a module communication address is set based on the magnitude of a DC voltage on the power connection. At block 708, a first command is received via the I2C clock connection and the I2C data connection. The first command is addressed to the module communication address. At block 710, the first command is responded to.

Figure 8:
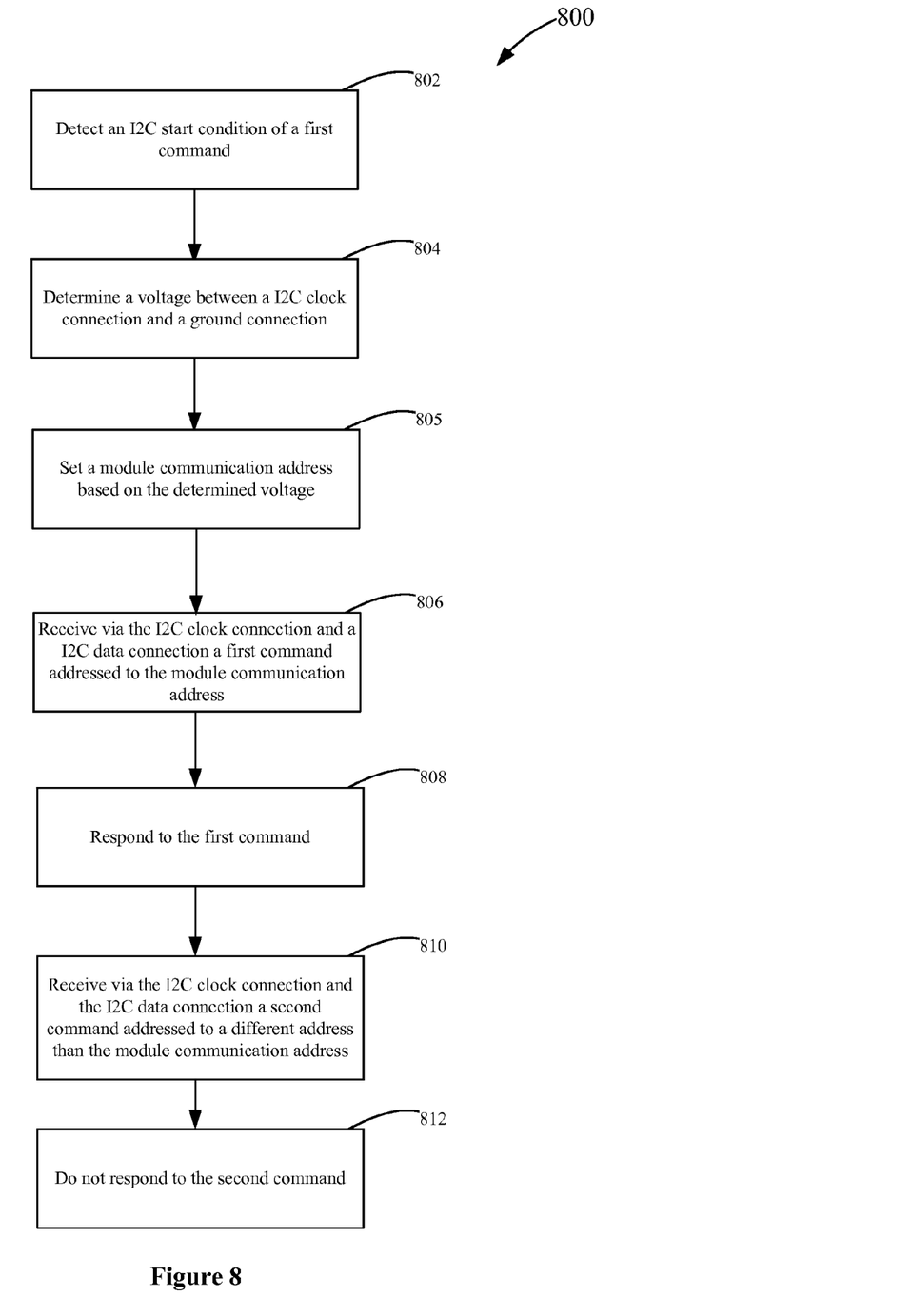

FIG. 8 shows an example embodiment of a method of operating a module according to one embodiment. The module has a ground connection, an I2C clock connection, and an I2C data connection.

At block 802, an I2C start condition of a first command is detected. This triggers block 804, to determine a voltage between the I2C clock connection and the ground connection and block 805 to set a module communication address based on the determined voltage. The setting may be based on the voltage measured between the I2C clock connection and the ground connection relative to a voltage measured between the power connection and the ground connection. Preferably, block 802, block 804, and block 805 occur at each I2C start condition so the module communication address may be changed dynamically.

At block 806, a first command addressed to the module communication address is received via the I2C clock connection and the I2C data connection. At block 808, the method responds to the first command. At block 810, a second command addressed to a different address than the module communication address is received via the I2C clock connection and the I2C data connection. At block 812, the method does not respond to the second command.

The acts of the methods may be performed in different orders than the given examples.

Figure 9:
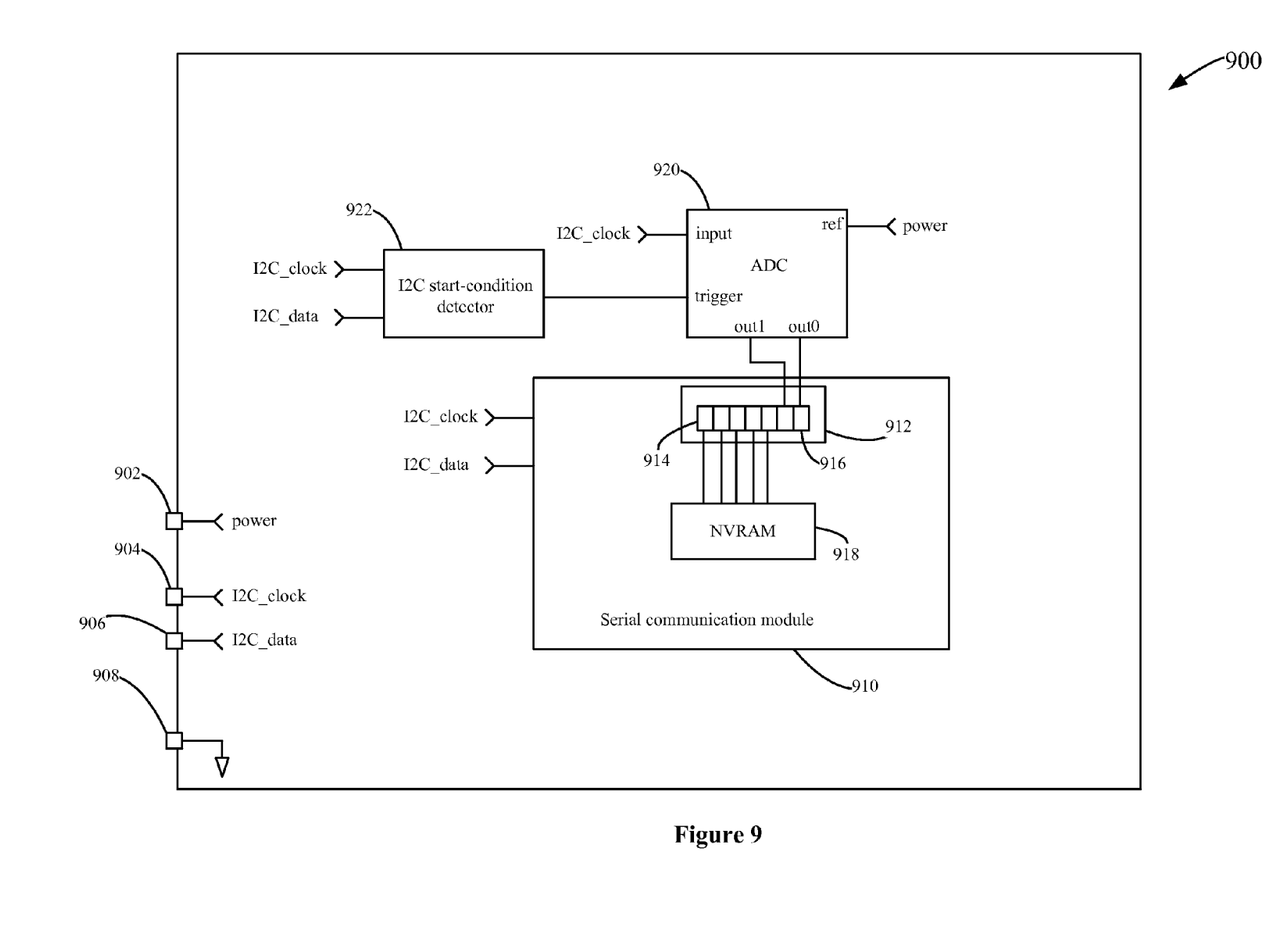
FIG. 9 and FIG. 10 are schematic diagram depictions of application specific integrated circuits according to embodiments of the present disclosure.

FIG. 9 shows a schematic diagram depiction of a circuit according to another embodiment of the present disclosure. An ASIC 900 has a power pin 902, an I2C clock pin 904, an I2C data pin 906, and a ground pin 908. The circuitry inside the ASIC is coupled to the power pin 904 and the ground pin 908. The ASIC has a serial communication module 910 that implements the I2C communication protocol as an I2C slave. The serial communication module 910 has an address register 912 that holds the I2C slave address. The address register 912 has seven bits including a most significant bit 914 (MSB) and a least significant bit 916 (ISB). Bits 6-2 are set by a non-volatile memory 918.

Bits 1 and 0 (LSB 916) are set by outputs of an analog-to-digital converter 920 (ADC). Of course, fewer or more address register bits may be set by the ADC 920. ADC 920 is a successive approximation ADC. Alternatively, ADC 920 may be a group of comparators with different comparison thresholds or another type of ADC as is known in the art. ADC 920 has a reference input that is connected to the power pin 902. Thus, the ADC measurements will be relative to the voltage on the power pin 902. The ADC input is connected to the I2C clock pin 904. The ADC trigger input is connected to the output of an I2C start-condition detector 922. The I2C start-condition detector 922 is constructed as is known in the art. For example, it may contain a high-to-low transition detector with an input connected to the I2C data pin 906 and an output connected to an AND gate, another input of the AND gate is connected to the I2C clock pin 904, and the output of the AND gate is connected to the output of the I2C start-condition detector 922. The I2C start-condition detector 922 may be configured to detect when the I2C clock pin 904 is greater than 1V while the I2C data pin 906 transitions from greater than 1V to less than 1V. In this circuit configuration, the ADC will set the address register LSB based on the voltage on the I2C clock pin 904 at the I2C start condition. The ADC conversion speed is faster than the transmission time of the I2C header so that the address register 912 is stable before an I2C master finishes sending a transmission address. The ADC may contain an offset such that an output with all bits equal to zero occurs when the input voltage is, for example, equal to or less than 70% of the reference voltage. ASIC 900 may be used, for example, in module 304 and module 306 shown in FIG. 3. ASIC 900 may contain an authentication module configured to perform an authentication procedure.

It is preferable to set the least significant bits of the address register 910 based on the I2C clock voltage so that the ASIC's potential addresses, at least the potential addresses set by the I2C clock voltage, are contiguous in the I2C address space. This makes it easier for a user to check for conflicts between devices on the same I2C bus than if the I2C clock voltage was used to set the most significant bits of the address register.

Figure 10:
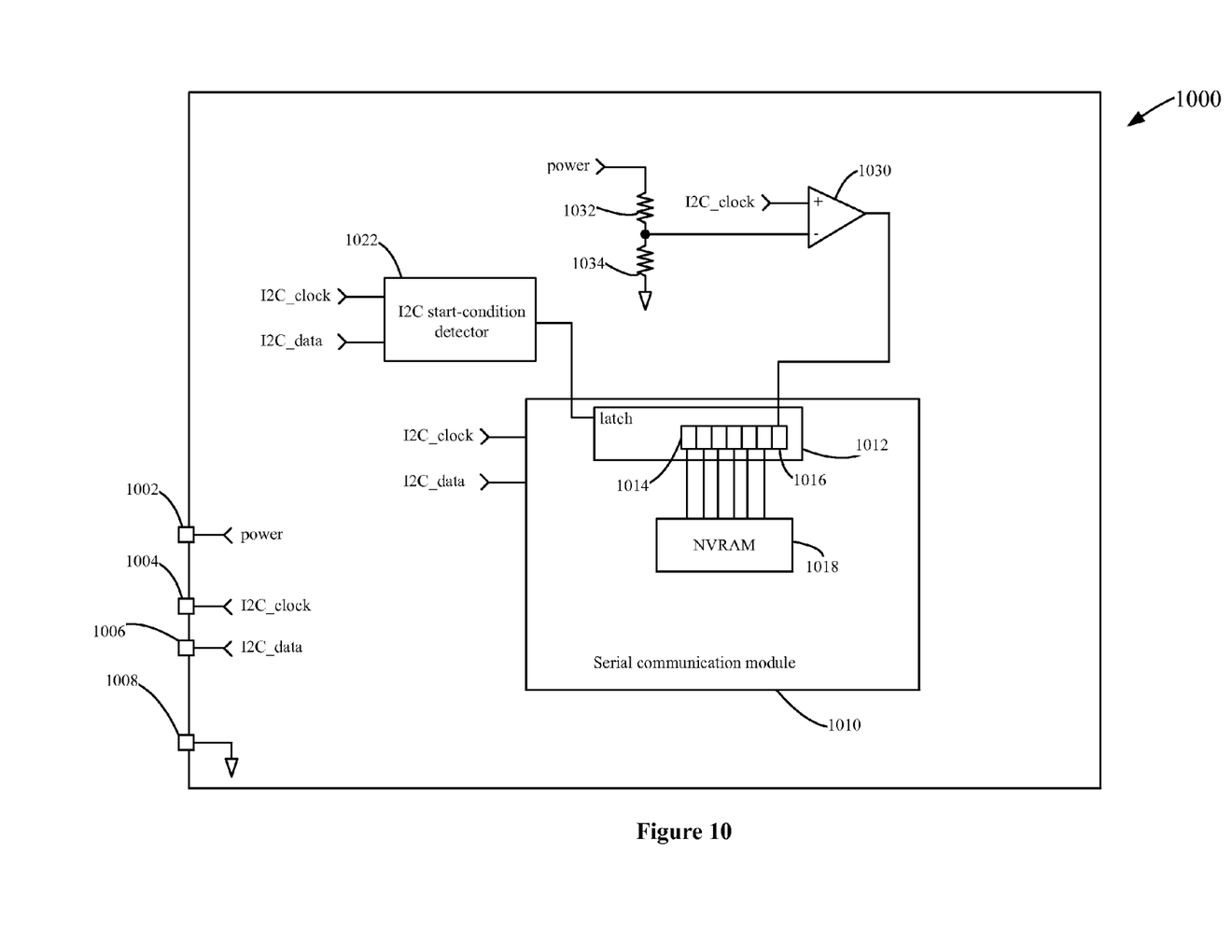

FIG. 10 shows a schematic diagram depiction of a circuit according to another embodiment of the present disclosure. ASIC 1000 has a similar design to ASIC 900, and like reference designators signify like components. Address register 1012 has a LSB 1016 set by an ADC that in this example is a comparator 1030. The positive input of comparator 1030 is connected to the clock pin 1004. The negative input of comparator 1030 is connected to a resistor divider made of resistor 1032 and resistor 1034 that are driven by the power pin 1002. Resistor 1032 may be, for example, 1 k ohm and resistor 1034 may be 10 k ohm. The address register 1012 has a latch input 1036 connected to the output of an I2C start-condition detector 1022. The latch keeps the address register 1012 stable while the clock pin 1004 transitions during an I2C transmission. ASIC 1000 may be used, for example, in module 304 and module 306 shown in FIG. 3. ASIC 1000 may contain an authentication module configured to perform an authentication procedure.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

What is claimed is:

1. A method of operating a module having a power connection, a ground connection, a non-volatile memory, an I2C clock connection, and an I2C data connection, the method comprising:
    determining a voltage between the I2C clock connection and the ground connection;
    setting a module communication address based on the determined voltage;
    receiving via the I2C clock connection and the I2C data connection a first command addressed to the module communication address; and
    responding to the first command,
    wherein the setting a module communication address sets the most significant bit of the module communication address based on the non-volatile memory.

2. The method of claim 1, further comprising receiving via the I2C clock connection and the I2C data connection a second command addressed to a different address than the module communication address and not responding to the second command.

3. The method of claim 1, further comprising detecting an I2C start condition of the first command, wherein the determining is triggered when the I2C start condition is detected.

4. The method of claim 1, wherein the setting is based on the voltage measured between the I2C clock connection and the ground connection relative to a voltage between the power connection and the ground connection.

5. An authentication module configured to perform the method of claim 1.

6. An authentication module configured to perform the method of claim 2.

7. An authentication module configured to perform the method of claim 3.

8. An authentication module configured to perform the method of claim 4.

9. An authentication circuit comprising:
    a power input pin;
    an I2C clock pin; and
    an I2C data pin,
    wherein the authentication circuit has a slave I2C address and is configured to set the slave I2C address to one of a first address and a second address based on a voltage on the I2C clock pin when the I2C clock pin is greater than 1V while the I2C data pin transitions from greater than 1V to less than 1V.

10. The authentication circuit of claim 9, wherein the authentication circuit is configured to measure the voltage on the I2C clock pin relative to a voltage on the power input pin.

11. The authentication circuit of claim 9, wherein the authentication circuit is configured to respond based on the slave I2C address to one of a first command and a second command.

12. An application specific integrated circuit (ASIC) comprising:
    a power pin;
    a ground pin;
    an I2C clock pin;
    an I2C data pin;
    a serial communication module having an address register having a plurality of bits including a least significant bit, the serial communication module is coupled to the power pin, the ground pin, the I2C clock pin, and the I2C data pin; and
    an analog-to-digital converter having an input coupled to the I2C clock pin and a first output coupled to the least significant bit of the address register,
    wherein the ASIC has a non-volatile memory and the address register has a most significant bit coupled to the non-volatile memory.

13. The ASIC of claim 12, wherein the analog-to-digital converter has a second output coupled to a bit of the address register that is not the least significant bit.

14. The ASIC of claim 12, wherein the analog-to-digital converter has a trigger input and the ASIC has an I2C start-condition detector having an output coupled to the trigger input.

15. The ASIC of claim 12, wherein the address register has a latch input and the ASIC has an I2C start-condition detector having an output coupled to the latch input.

16. The ASIC of claim 12, wherein the analog-to-digital converter has a reference input coupled to the power pin.

* * * * *